United States Patent
Patino Martinez (10) Patent No.: US 11,492,681 B2
(45) Date of Patent: Nov. 8, 2022

(54) METHOD FOR EXTRACTING BASE AND PRECIOUS METALS BY A PRE-TREATMENT THAT LEADS TO SOLUBILISATION OF THE REFRACTORY MATRICES THEREOF

(71) Applicant: Eduardo Luis Patino Martinez, Concepcion (CL)

(72) Inventor: Eduardo Luis Patino Martinez, Concepcion (CL)

(*) Notice: Subject to any disclaimer, the term of this patent is extended or adjusted under 35 U.S.C. 154(b) by 398 days.

(21) Appl. No.: 16/628,966

(22) PCT Filed: Sep. 5, 2018

(86) PCT No.: PCT/CL2018/000028
§ 371 (c)(1),
(2) Date: Jan. 6, 2020

(87) PCT Pub. No.: WO2019/006568
PCT Pub. Date: Jan. 10, 2019

(65) Prior Publication Data
US 2020/0224291 A1    Jul. 16, 2020

(30) Foreign Application Priority Data
Jul. 5, 2017    (CL) .................................. 1777-2017

(51) Int. Cl.
C22B 11/08    (2006.01)
C22B 3/08    (2006.01)
C22B 11/06    (2006.01)

(52) U.S. Cl.
CPC ............... C22B 11/08 (2013.01); C22B 3/08 (2013.01); C22B 11/06 (2013.01)

(58) Field of Classification Search
CPC ........... C22B 11/08; C22B 3/08; C22B 11/06; C22B 1/243; C22B 1/244; C22B 15/00; C22B 3/04; C22B 23/0407; C22B 1/14
(Continued)

(56) References Cited

U.S. PATENT DOCUMENTS 4,256,706 A * 3/1981 Heinen ................... C22B 1/243
                                                               75/747
5,421,858 A * 6/1995 Smith ....................... C22B 1/16
                                                               75/751
(Continued)

FOREIGN PATENT DOCUMENTS

CL            40891       *  1/2001
CL      200202694       *  4/2004
(Continued)

OTHER PUBLICATIONS

CL 40891 Translation (Year: 2001).*
CL 42673 Translation (Year: 2006).*
CL 201001345 Translation of Abstract (Year: 2011).*

*Primary Examiner* — Brian D Walck
*Assistant Examiner* — Danielle Carda
(74) *Attorney, Agent, or Firm* — Maxey-Fisher, PLLC; Brittany J. Maxey-Fisher (57) ABSTRACT

A method for extracting base and precious metals, all contained in refractory minerals, using aqueous media. The method includes mixing the mineral ($Cu_2S$, CuS, $CuFeS_2$, $Cu_5FeS_4$, $FeS_2$, FeAsS.NiS, $(Ni,Fe)_xS_y$), ground to an appropriate size (2.5 centimetres), with a specific dose of solid reagent in a rotary agglomeration drum and then adding slightly acidified water to obtain a defined water content (5-8%) depending on the type of gangue contained in the metal-containing solid, thereby forming an agglomerate that will form a heap, which is subsequently allowed to stand for a period of several days (20-60 days), during which the conditions required to transform the refractory matrix into a highly soluble solid will be generated. Finally, appropriately regulated irrigation is applied, thus resulting in extraction of the metal by simple aqueous washing.

6 Claims, 3 Drawing Sheets

(58) Field of Classification Search
USPC .......................................................... 75/744
See application file for complete search history.

(56) References Cited

U.S. PATENT DOCUMENTS

| | | | | |
|---|---|---|---|---|
| 2004/0144209 A1* | 7/2004 | Faine | ................ | C22B 15/0004 |
| | | | | 75/743 |
| 2009/0173188 A1* | 7/2009 | Muller | ................ | C22B 15/0069 |
| | | | | 75/743 |
| 2015/0232963 A1* | 8/2015 | Patino Martinez | .......................... | |
| | | | | C22B 15/0008 |
| | | | | 75/743 |
| 2018/0119247 A1* | 5/2018 | Engdahl Toledo | ....... | C22B 1/24 |

FOREIGN PATENT DOCUMENTS

| | | | | |
|---|---|---|---|---|
| CL | 42673 | | * | 6/2006 |
| CL | 2015001298 | A1 | * | 5/2016 |
| ES | 2379202 | | * | 4/2012 |
| ZA | 201206310 | | * | 8/2012 |

* cited by examiner

DIAGRAM of HYPEX/GOLDEST ADAPTATION to LEACHING's LAYOUT

LEGEND (a) Material SCRE
(b) Crusher
(c) Conveyor for SCRE
(d) Hopper to feed agent DAE
(e) MIXER: SCRE – DAE
(f) Wetting line
(g) Conveyor for SCRE/DAE
(h) Heap for SCRE's TRANSFORMATION
(i) Wash Line: Neutral Wash
(j) To conventional Purification and Precipitation

METHOD FOR EXTRACTING BASE AND PRECIOUS METALS BY A PRE-TREATMENT THAT LEADS TO SOLUBILISATION OF THE REFRACTORY MATRICES THEREOF

CROSS REFERENCE TO RELATED APPLICATION

This application is a national stage entry of PCT/cl2018/000028 filed Sep. 5, 2018, under the International Convention and claiming priority over Chilean Patent Application No. CL1777-2017 filed Jul. 5, 2017.

TECHNICAL FIELD

The present application is a method for the simultaneous extraction of multiple chemical elements (base metals, precious, rare earths, semimetals, etc.) contained in various materials (minerals, industrial wastes, meteorites, etc.).

STATE OF THE ART

As one of the most robust industries, in size and economy, the mining industry is taken as the basis of analysis to support and justify the invention of the METHOD OF EXTRACTION OF CHEMICAL ELEMENTS FROM MATERIALS BY PRE-TREATMENT CONDUCTING THE SOLUBILIZATION OF ITS REFRACTORY SPECIES, from now on "The Method".

In the mining industry, there are two different types of metal extraction processes: leaching process and concentration process.

The process of heap leaching for the extraction of metals from minerals, consists of unit operations of size reduction, agglomeration, leaching in fixed or agitated bed, purification and precipitation of a chemical element. This type of leaching is designed to extract a single metal, i.e. copper, and has advantages such as low amount of investment needed and low operation costs; and disadvantages like low extraction performance and long processing cycle.

Bacterial and pressure leaching technologies exist but are evaluated by a trade-off between cost and performance, so the choice of technology lies in the commercial value of the metal extracted.

The main criterion in the pre-selection of the leaching process (in all its variants) is the property of dissolution in acidic medium of the species that contain the metal and for that reason it is applied almost exclusively to minerals of metallic oxides. The process consists of leaching cycles of weeks or months, medium or high acid consumption and mean recoveries metal (70-80%) and generates a solid residue called SPENT ORE.

The other process is the froth flotation—fusion—metal refining process. It is a process consisting of multiple unit operations such as size reduction (crushing and grinding), froth flotation, solid-liquid separation, drying, melting—conversion of the concentrate and metal refining. It is a process which requires high investment and has high operating cost. Its disadvantages lie on several fronts: high energy consumption (mainly grinding and smelting), very high fresh water requirement (grinding and flotation), high pollution potential (polluting gases since fusion—conversion). Its main advantage is the speed of production and efficiency to obtain concentrates. This process is used primarily to extract metals from sulphide ores, very few soluble in acid, so they cannot be treated by the leaching process.

Flotation engineering is somewhat recharged. Each unit operation consists of a large number of equipment: several SAG—ball mills, hundreds of large flotation cells, nest of 8 to 10 hydro cyclones as a grinding control stage, 1-2 settlers, 1-2 clarifiers. All this takes place only at the stage of obtaining the concentrate, which is only the achievement of a mass of mineralogical species (and not of the metal) and generates a large amount of waste, called TAILINGS. This concentration process is complemented by melting—conversion stages, where large-scale furnaces, high energy consumption with great potential for gaseous contamination are used, generating the liquid metal at high temperature (for subsequent refining) and produces a type of waste called SLAG.

Currently, 85% of metal production is developed through the flotation process and the remaining 15% is processed by leaching. This trade-off between the leaching and flotation processes has caused the challenge of processing the sulphide minerals through a leaching process in a commercial manner. A clear example is that the important copper mining industry has proposed to demonstrate technically and commercially the dissolution by leaching of its main and most abundant natural source: chalcopyrite.

Many global studies at the level of research centers, universities and mining companies have focused on this challenge, unfortunately without a positive result accepted by the industry. Universities such as British Columbia (Canada), Cape Town (South Africa), Queensland (Australia), TUDelft (The Netherlands) and research centers such as CSIRO, BRGM (France), JKTEch (Australia), Max Planck Institute (Germany) among others, have made significant efforts in the study of chemical/bacterial leaching of chalcopyrite. The following references by Dr. Helen Watling of the Australian CSIRO is an excellent result of the studies developed to date in that direction.

Chalcopyrite hydrometallurgy at atmospheric pressure: 1. Review of acidic sulfate, sulfate—chloride and sulfate-nitrate process options. Hydrometallurgy 140: 163-180, November 2013

Chalcopyrite hydrometallurgy at atmospheric pressure: 2. Review of acidic chloride process options. Hydrometallurgy 146: May 2014.

Review of Biohydrometallurgical Metal extraction from Polymetallic Mineral Resources. Minerals 5 (1): 1-60. December 2014.

Several important conclusions can be obtained from the state of the art, to date:

1. The leaching of sulfur minerals of copper, zinc, lead, nickel, molybdenum, silver or other metals has not been commercially demonstrated.

2. All scientific and technological efforts have focused on optimizing each of the unit operations of concentration—fusion—conversion. The concrete thing is that the optimization focused on increasing the dimensions of the equipment, the search to spend less energy and increasing the control of gaseous emissions.

3. The residues of the leaching and flotation-fusion-conversion processes (SPENT ORE, TAILINGS and SLAG) contain small to medium quantities of the metal due to the inefficiency level of both mentioned extraction processes. These wastes are considered environmental liabilities, mainly based on the hypothesis that it is no longer possible to extract more metal and therefore the problem is about how to dispose of the waste in the environment and its passivation control over time.

4. The industry has generated immense historical amounts of SPENT ORE, TAILINGS and SLAG that are have been disposed of in nature and that are recognized as a great environmental problem.

5. The most important conclusion is that sulphide minerals have proven not to be commercially leachable, for that modern leaching history is necessary to know the road of its modern commercial development. You can begin with TL (thin layer) heap leaching which was a technological development led by the Sociedad Minera Pudahuel, a pioneer in Chile. While it originated in a patented concept in the U.S. in the second half of the seventies, it was perfected by this company from its original definition in the laboratory field until it was taken to an industrial application in 1980. These improvements also gave rise to a patent of its own, registered first in Chile (Intellectual Property Registry No. 32.025 "Leaching procedure in heap to layers of mixed copper ore of oxide and sulphide state") and then in some other countries. In addition, the Sociedad Minera Pudahuel developed bacterial leaching technology in heap for thin layers or BTL through systematic research aimed at knowing the mechanisms of leaching assisted by bacteria.

The results basically consisted of management models for the optimization of the sulfur ore at the leaching processes, thus considerably expanding the spectrum of minerals capable of being economically leached.

For its part, the Compañía Minera Mantos Blancos for its part in 1971, in its Intellectual Property Registry No. 25,930, exhibited its "Improvements in the leaching of mixed minerals of copper oxides and sulphides and other metals using chlorine and compounds oxidized from it, at room temperature and 50° C.".

Deleew Schmitz Partnerschip in 1979, in his Intellectual Property Registry No. 30,914, reported on his "Procedure for the recovery of copper and silver from sulfur concentrates by leaching with oxygen and ferrous chloride".

In 1981, DU PONT DE NEMOURS AND COMPANY, in its Intellectual Property Registry No. 32,426, noted its "Procedure for recovering copper from sulphide mineral concentrates by leaching with nitric acid and sulfuric acid to produce a solution containing copper and iron ions supplemented with copper electrodeposition after reducing ferric ions and nitrate and other impurities to obtain high purity copper."

Degussa Aktiengesellschafe, in the Intellectual Property Registry No. 38,554 of 1993, coined its "Process to leach concentrated minerals or gold and silver wastes by leaching with cyanide supported by hydrogen peroxide and manganese compounds as catalysts for the decomposition of said peroxide"

And finally, for the purposes of this text, Minnesota Mining and Manufacturing Company, in its Registry of Intellectual Property NO 39,510 of the year 1998, specified its "Method of recovering gold and silver by leaching with an aqueous solution containing certain fluoroaliphatic surfactants and polymeric."

Internationally, patent US7722756132 of the year 2010 "Process for multiple stage direct electrowinning of Copper" stands out, which relates to a process for the direct electrolytic extraction stage of copper; US7736488132 "Process for recovery of Copper from copper-bearing material using pressure leaching, direct electrowinning and solvent/solution extraction" which relates to a procedure for the recovery of copper from copper-containing material by pressure leaching and extraction direct electrolytic and solvent/solution extraction; and finally patent US807085132 of the year 2011 "Chloride heap leaching" which relates to a method of heap leaching aimed to recover copper from a primary copper sulfide mineral in which the mineral is leached in a chloride solution of acid/sulfate in conditions which require the redox potential of the mineral surface to be below 600 my to cause the sulfide to dissolve into copper.

After these inventions, the dynamics in the extraction activity through leaching in the world has become new concepts, such as bioleaching (using acidophilic bacteria) and leaching with thiosulfate, among others.

In the coming years, the development of the world mining industry will be based on exploiting new basically sulphide mining reserves, for which, at present, the mineral concentration processes are used. As described in the state of the art, compared to concentration, hydrometallurgy is not very competitive, given that the first one allows a recovery of more than 80% in a matter of hours and the second one reaches between 30% and 60% recovery in periods over 300 days. In this sense, it becomes clear that it is crucial for the industry to have technologies that allow greater efficiency and productivity of resources.

Precisely because of all the above, it is that the method proposed by the present invention arises as a new technology, alternative to conventional and highly integral processes, minimizing processing and input cycles and at the same time maximizing simultaneous recoveries of various chemical elements.

SUMMARY OF THE INVENTION

The method consists in the injection of an electron flow that allows the electronic structure of materials to be manipulated, to solubilize the compounds that contain the chemical elements. The release of the chemical elements is finally achieved by washing the previously solubilized material in neutral water.

The method is based on a quantum property of electronic manipulation that allows modifying the solubility property of a material.

GOLDEST is the nomination of the METHOD when it is applied to extract gold, silver and platinum.

HYPEX is the nomination of the METHOD when it is applied to extract any other kind of chemical elements.

DETAILED DESCRIPTION OF THE INVENTION

The method of the invention was based on the search for the reasons why it is NOT possible to leach sulfur minerals. One of the main limitations found is that the leaching mechanism is based on overcoming activation energies characteristic of the shock of reactive species, expressed by the Arrhenius equation, which to date is recognized as an empirical equation. Try to determine the leaching rate, but it does not represent the mechanism.

Based on the foregoing, the method of the invention is based on the fact that given the limitation of leaching sulfur species, there is a need to develop a new method of extracting chemical elements contained in solids from different sources.

The METHOD OF EXTRACTION OF CHEMICAL ELEMENTS FROM MATERIALS THROUGH A PRETREATMENT CONDUCTING THE SOLUBILIZATION OF ITS REFRACTORY SPECIES is an alternative and different process to conventional metal extraction processes by leaching and concentration-fusion-conversion of minerals and focuses on processing a wide range of materials, which by manipulating its electronic structure manages to transform it into a highly soluble material in water and makes it possible to simultaneously extract multiple chemical elements of commercial value.

Given the versatility of the METHOD, its industrial application is perfectly feasible in the mining industry (minerals and concentrates), and in the remediation of environmental liabilities such as gravel, tailings and foundry slag of all types of origin, since the concept is based in quantum laws and their implementation does not require large investments.

The METHOD delivers many benefits, namely:

Allows to process wide diversity of materials and the final extraction of more than one chemical element It generates recoveries greater than 85% and reaches high kinetics of extraction by washing.

Reduces washing water requirements up to 0.5 m3/ton of processed material.

Reduces operating costs, extraction cycles, energy consumption by up to 50% compared to a conventional leaching process Optimizes the availability of inventories and allows the revaluation of all types of resources and environmental liabilities.

Basic concepts and scope of the invention by method:

Material is defined as that solid matrix that contains valuable chemical elements to be extracted. The concept of material is the same defined by the physics of condensed matter, defined by its properties, which at the same time are determined by the electronic structure, beyond its crystalline structure. To understand the personality of a material, you must study its electrons.

All minerals, concentrates, tailings, rubble, slag from all types of industry, underwater minerals and materials such as meteorites and extraterrestrials will be considered as sources of multiple chemical elements, for the purposes of this invention. The diversity of the properties of these materials (semiconductors and/or topological), observed from the focus of their electronic structures, can range from SIMPLE, COMPLEX, REFRACTORY and EXOTIC materials. From now, SCRE materials.

Electronic structures define several properties that can be used to facilitate the extraction of chemical elements. Two of the most important properties found in SCRE materials in general are:

The energy gap of a material is the measure of its conductivity (difference between the conduction band and the valence band) and is defined by the energy of the Fermi level, which measures the energy of the electrons most bound to the solid. The positions of electrons and/or holes can be manipulated by the addition or removal of electrons The topology of a material is a phase that determines the property of allowing conductivity on the surface and at the same time electronic isolation in the bulk of the material. The removal or addition of electrons from the electronic structure of the material also allows changing the properties of the material.

The invention is based on the basic identification that the electron being a quantum particle, has transport mechanisms totally different from that of an ion. An electron is transported by two specific mechanisms: tunneling and stretching.

Therefore, the invention is based on the integration of three aspects:

The delivery or extraction of electrons to a SCRE material, allows for example to modify the energy gap and/or activate the topological property and therefore change the property of SCRE material The supply of the donor or electron extractor, from now on DAE, is done through an external excitation.

As a result of the above, SCRE materials are TRANSFORMED into highly water-soluble materials.

A TRANSFORMED material suggests that each of the compounds contained therein and containing their respective chemical elements, all are in SOLUBLE form Subsequently, the water washing of this soluble material, allows to extract in solution, ALL the different types of chemical elements previously solubilized by the method.

The invention provides a method to achieve maximum transformation of the original SCRE material into a highly water-soluble material. In that way, the chemical elements (metal, semimetal, etc.) will be contained in a solid that is of high water solubility compared to the original matrix and, therefore, the washing solution will contain multiple chemical elements and will be faster, more efficient and it will require a minimum of inputs and reagents, that is, it will only need a washing step.

Stages of the Method a) The properly particulate SCRE material is brought into intimate contact with a certain amount of DAE agent.

The granulometry of the SCRE material depends on its origin, according to:

If the SCRE material is a FRESH ORE/MINERAL, it is suggested to crush up to P80=2 inches.

If the SCRE material is a TAILINGS or CONCENTRATE, these already come at the micron level and will be accepted as such.

If the SCRE material is a SPENT ORE, it already comes at the level of ½ to 2 inches and will be accepted as such.

If the SCRE material is a SLAG from any industry, it can have several types of particle sizes ranging from millimeters to inches. If the size is larger than 3 inches, it is recommended to reduce them to a P80=2 inches, otherwise it will be accepted as is.

b) The DAE agent is a solid powder type (consisting of a blending of salts) and is added at a rate of between 2 to 15 kg per ton depending on the type of SCRE material processed.

Note: The DAE agent is a blending of proportions of salts calculated according to the type of SCRE.

c) The mixture between DAE agent and SCRE material is carried out at a humidification range of 3 to 4%, depending on the physical quality of SCRE material, not allowing it to hydraulically saturate. The humidification can be carried out with fresh, salt water or with recirculation solutions of the integral process. The mixing between DAE agent and SCRE material is carried out in different types of reactors, depending on the granulometric profile of the SCRE.

Note: At this point, it is noted that the designs of the types of mixers are being sent at the respective patent application.

d) The mixture thus formed is left in electronic digestion for a period ranging from 5 to 60 days, preferable 10 to 20 days. During this period, the conditions that allow the electronic activity to transform the SCRE material into a very soluble solid that will contain the metal (s) to be extracted are generated. Resting can be done on the floor (previously prepared for this purpose).

e) Once the resting time has elapsed, at this point, the metal (s) are extracted by simply washing with neutral water. The wash rate is between 0.5 to 0.7 m3 of neutral water per ton of SCRE washed. There are several types of scrubbers that will be applied depending on the granulometry of the SCRE material that was processed. The types of washers range from fixed bed to stirred reactors of 1 or 2 compartments.

Figure 2:
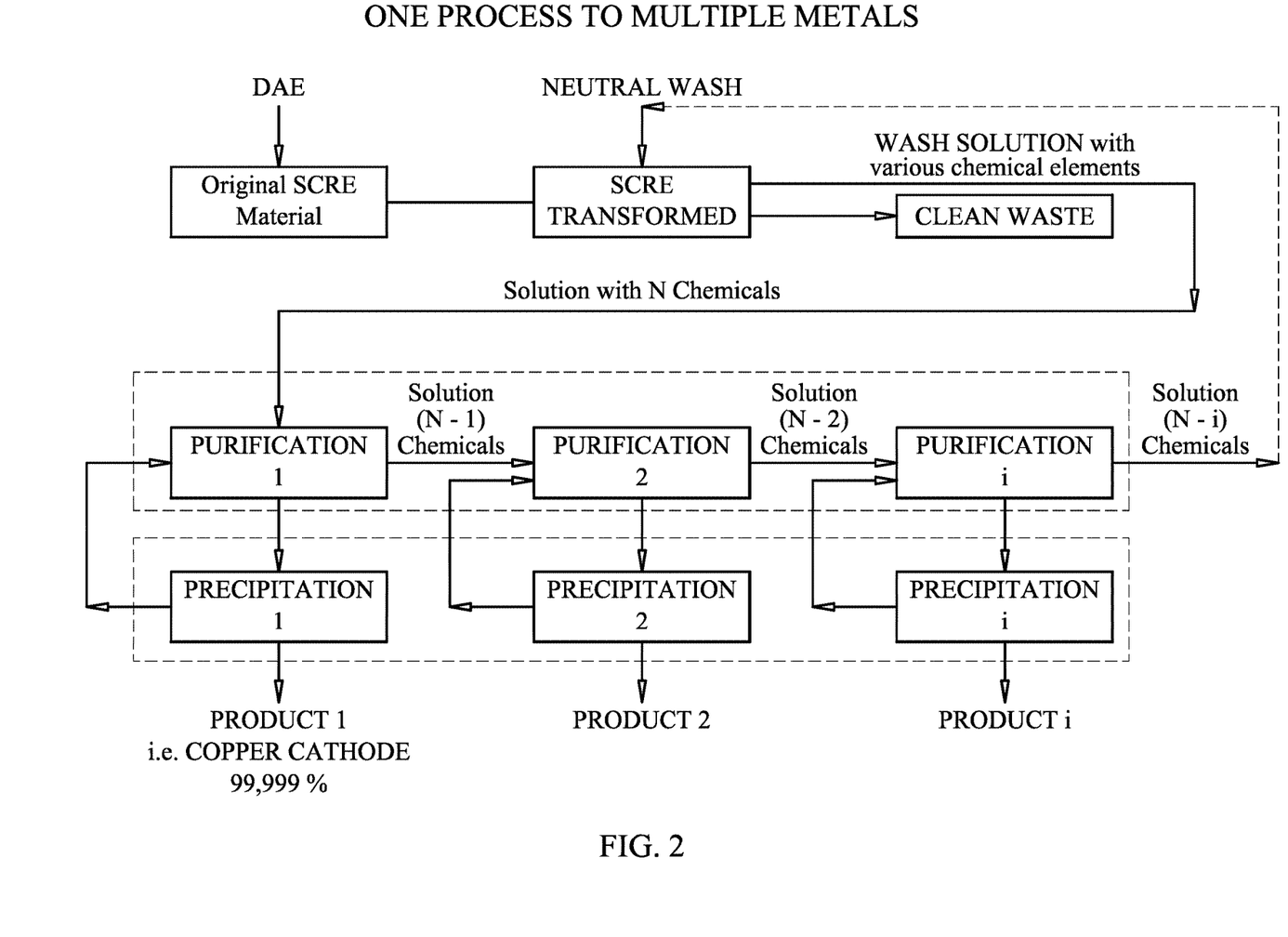
FIG. 2 shows a block diagrams including a process containing various chemical elements, continues the conventional purification—precipitation stages, just to get that elements as different products.

Note: At this point, it is noted that the designs of the types of washers are being sent at the respective patent application.

f) Since the DAE agent used in the mixing stage is not a chemical reagent itself, it can be lowered from the wash solutions, to prevent some ionic loading effect of the solutions downstream of the process.

g) The washing solution, from now on WS, may contain more than one chemical element to recover due to the high degree of solubility obtained in the transformation stage.

h) The WS containing various chemical elements, continues the conventional purification—precipitation stages, just to get that elements as different products. See FIG. 2

Applications (Hypex)

1. As described in the Detailed Description item, you can specify the SCRE materials to which the method can be applied. They are capable of being processed by the method all SCRE materials, which are detailed:

Oxidized, sulphured and complex minerals of copper, zinc, iron, nickel, cobalt, molybdenum, lead, silver, gold, tin, antimony, vanadium, chromium, titanium, manganese cadmium, aluminum, bismuth, lithium and rare earths.

Concentrates of the chemical elements mentioned in the previous item.

Tailings and Spent Ore of the chemical elements mentioned in the previous item.

Non-ferrous smelter slags

Special mention for minerals containing gold encapsulated in pyrites or arsenopyrites, where the method allows to decapsulate and solubilize gold without the use of cyanide.

2. The heap leaching process of minerals will be taken as a reference, as it is the simplest to operate and has the lowest investment and operation cost. It is noted that the SCRE materials that are applied to be processed by adapting this heap leaching technology are those that comply with a particle size between ¾ to 2 inches of P80.

In relation to the above, we will detail how the method can be adapted to each of the stages that has the heap leaching of minerals.

2a. Regarding heap leaching:

Leaching: processes only oxidized minerals

The Method: processes any SCRE material that meets a granulometric level

2b. Regarding the unit operation of Crushing: For heap leaching, crushing plants reduce the size of the ore/rock to cause a balance between porosity of the bed of the heap and the porosity of the rock so that the chemical leaching reagent (normally the hydrogen ion), can have the ability to be transported through the bed and introduced into the rock so that the chemical reaction of dissolution develops.

In the case of the METHOD, the reduction in size is defined to cause an electron transport on the surface and bulk of the rock. The ion and the electron have very different transport mechanisms.

In other words:

Leaching: looks for ion diffusion

The Method: look for transport through tunneling and stretching of the electrons 2c. Regarding the unit operation of Mixture: the METHOD refers to the addition of an "active agent" that is the electron donor/acceptor, named DAE, as a way of protecting said agent.

Regarding the unit operation of the Mixture: In the leaching of oxidized minerals, an agglomerating drum is used, as is its own definition, it is an action of mixing very fine and fine solid particles with those of larger size, so that they can form integral glomers that allow a greater porosity of the bed, when these make up the leaching stack. Therefore, it is an operation aimed at modifying physical conditions of the particulate system.

In other words:

Leaching: looks for the formation of glomers

The Method: seeks the homogenization of the active donor/electron acceptor agent 2d. Regarding the unit operation of Rest: While a leaching heap must rest to allow the humidity supplied to generate the hydrogen bonds that ensure mechanical stability of the formed glomers/agglomerates, the METHOD is a period of electronic transformation that the SCRE material undergoes.

2e. Regarding the unit irrigation operation: Leaching continuously provides acidic solutions throughout the cycle that allows to achieve adequate levels of recovery of a single chemical element, i.e. copper. The METHOD supplies water in dosed form to dislodge all the chemical elements solubilized in the previous stage.

Figure 3:
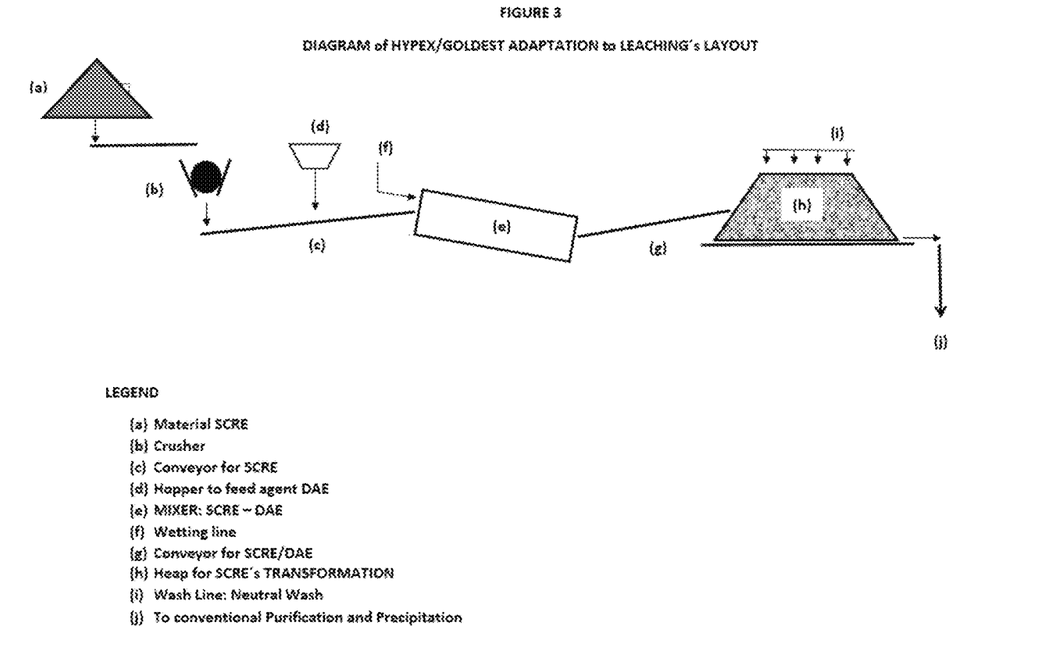
FIG. 3 shows a diagram of Hypex/Goldest adaptation to leaching layout.

Obtained the WS, this continues the conventional stages of purification and precipitation See FIG. 3

2f. The DAE agents are varied depending on the origin of the SCRE material that needs to be solubilized: a) They can be solid salts such as NaCl, NaNO3, MgCl2, Ureatos, Phosphates, Oxalates, Citrus; b) Mix SCRE and solid DAE agent, before the humidification stage at ambient conditions; c) The solutions for humidification at this agglomeration stage may even be the raffinate solution that circulates in the process, that is, solutions with sulfuric acid content (10 to 12 gpl) and pH less than 2.5.

2g. Once the rest period is over, the aqueous extraction of the valuable metal is carried out by drip irrigation of neutral water. Irrigation must be continuous, at a moderate flow and is done by sectors, expressed in units of liter/square meter per hour between 3 to 5. This means that in each square meter that is kept watering for one hour, 3 to 5 liters of water are being added, until ALL the metals that have been solubilized during the rest period are retrieved. The reason for being able to use neutral water is that the solubilization of the species is very high and for this fact even seawater can be used.

2h. The method of the present invention can be repeated as many times as necessary to achieve the most optimal extractions, depending on the type of matrix and the desired financial economic objective. That is, after washing the SCRE material for the first time, the heap is allowed to drain. Once drained, the site is re-humidified with highly concentrated solutions of the same DAE agent used in the first stage and/or one that is more intense. The re-humidification of the battery should be carried out at a very low rate: 2 to 3 lt/m2×hour, thus ensuring that the re-humidifying solution does not leave the heap to ensure its permanence inside the pad. It is left to rest for 10 to 20 days so that the electron transports required for the new transformation of the remaining SCRE material are generated again and finally, it is washed again to proceed to extract the complementary part of the valuable metals.

2i. If the SCRE material is polymetallic, the wash solution will contain more than one chemical element due to its degree of electronic transformation. In that case, operations downstream of purification and precipitation must be adapted as a sample

FIG. 3

3. Application of the method for SCRE materials of granulometry at micron level:

Mixing: The DAE agent is added in a mixer of the type mentioned in section 2. The dose is between 2 to 15 kg per ton of SCRE.

Rest: Resting is done on a suitably prepared floor, in a properly conditioned pad. This period is between 10 to 20 days Washing: This is done by in a conventional hydro cyclone or a stirred reactor, at a rate of 0.5 to 0.7 m3 of water per ton of SCRE material to be washed.

Method of the Invention Applied to the Specific Extraction of Gold (Goldest)

Gold can be found geologically in two ways:

MINERAL TYPE I: Free gold particles in oxidized matrix.

MINERAL TYPE II: Gold/silver particles encapsulated in sulphide grains that can be pyrite, arsenopyrite or other sulphide, which are contained in silicate matrix.

In the case of free gold particles in oxidized matrices, heap leaching with cyanide solutions is the most standard and used process. The obtaining of metallic gold is achieved by applying the Merrill Crowe process. The method of the invention considers agglomerating with solid cyanide, in the stage prior to leaching, to drastically accelerate the solubilization of gold, in such a way to drastically decrease the process cycle and increase its recovery.

In the case of gold particles encapsulated in sulphide grains that can be pyrite, arsenopyrite or other sulphide, contained in silicate matrix, the conventional cyanidation process is very limited, since cyanide cannot react with sulfide grains and even then, not dissolve the gold. There are three technologies to consider in this regard:

Reduce the ore to the size of microns, using crushers, ball mills and SAG, then float the pyrite/arsenopyrite, and then melt the concentrate to obtain gold bars. Process of high investment and operating costs.

Reduce the ore to the size of microns, using crushers, ball mills and SAG, then concentrate the pyrite/arsenopyrite by flotation, and then said concentrate is leached using reactors built of titanium at high pressure to finally obtain gold through the Merrill Crowe process. It is also a very expensive process in investment and operation. A variant is to bioleach the concentrate to destroy the pyrite, then wash and a second cyanide leaching is performed. All of it, in mechanically agitated tanks. This is a process known as BIOX. Even so, they remain high investment processes.

Reduce the mineral to the size of inches, using crushers, it is bacterially heap leached so that the microorganisms destroy the pyritic matrix, then the heap pad is washed, and a conventional cyanidation process is initiated (equivalent to that applied to MINERAL TYPE I). It is a process that requires a lot of time, excess of fresh water and is also of low efficiency.

For free gold particles in MINERAL TYPE I, or MINERAL TYPE II the method of the invention considers three alternatives that consist of agglomerating the mineral with solid cyanide and/or a DAE agent (specifically defined depending on whether the matrix is pyrite or arsenopyrite), in the pre-leaching stage, to dramatically accelerate and simultaneously three aspects of the process:

a) Transformation of pyrite/arsenopyrite into a soluble species, to allow agents to access and attack gold b) Achieve a high solubilization of gold, in such a way to drastically reduce the process cycle and increase its recovery.

c) In this case, washing with neutral water allows the extraction of gold and silver, eliminating the concept of leaching.

MINERAL TYPE I (Free gold particles in oxidized matrix):

In the method of the invention, applied to the mineral type I, NaCN or DAE agent can be used and consists of the following steps:

a) ALTERNATIVE 1 (Use of NaCN)

CRUSHING: The mineral is reduced to a size of 2 centimeters (if the oxidized mineral contains a lot of clay, the reduction in size must be made to 4 centimeters)

MIX: Before entering the mixing drum:

Solid lime is added directly from a No. 1 hopper to the conveyor belt. Lime comes in powder and is added between 0.5 and 5 k/ton, depending on the purity of lime to ensure a basic pH>11 when it starts to water.

Immediately afterwards the NaCN is added directly to the same conveyor belt from a Hopper No 2.

The dosage will be between 1-2 kg of NaCN per ton of ore. The NaCN must be granulated to a size between 2-3 millimeters.

TRANSFORMATION: At the exit of the drum, the formed mixture is transported to the pad. The material thus formed should stand for 5 to 10 days.

WASHING: After the transformation period, the battery is washed with neutral water or with refining solutions to extract the gold in a cyanide aqueous solution.

b) ALTERNATIVE 2 (Using DAE agent)

CRUSHING: The mineral is reduced to a size of 2 centimeters (if the oxidized mineral contains a lot of clay, the reduction in size must be made to 4 centimeters)

MIX: Before entering the mixing drum.

Solid lime is added directly from a #1 hopper to the conveyor belt. The lime comes in powder and is added between 0.5 and 5 k/ton, depending on the purity of lime to ensure a basic pH>11 when it starts to wash.

Immediately afterwards the DAE agent is added directly to the same conveyor belt from a Hopper No 2.

The dosage will be between 2-3 kg of the DAE agent per ton of ore. The DAE must be granulated to size between 2 to 3 millimeters.

That way the conveyor belt contains mineral, lime and DAE agent.

Upon entering the mixing drum, a perfect mixture of all solids is achieved. Inside the mixing drum raffinate solutions are added to reach the determined degree of wetting.

TRANSFORMATION: At the exit of the mixing drum, the formed material is transported to the pad. The material should rest for a period between 10 and 15 days.

WASHING: After the transformation period, the battery is washed with neutral water or with refining solutions to extract the gold in aqueous solution.

MINERAL TYPE II (Gold particles encapsulated in sulphide grains that can be pyrite, arsenopyrite or other sulphide, contained in silicate matrix):

The method of the invention applied to type II mineral can be applied in 3 alternatives and consists of the following steps:

b) ALTERNATIVE 1 (Using DAE agent)

It consists of using a single DAE agent for both effects: solubilize pyrite/arsenopyrite, releasing gold to simultaneously solubilize gold. Proceed as follows:

CRUSHING: The mineral is reduced to a size of 2 centimeters (if the oxidized mineral contains a lot of clay, the reduction in size must be made to 4 centimeters)

MIXER: Add DAE agent before entering the mixing drum.

Solid lime is added directly from a #1 hopper to the conveyor belt. Lime comes in powder and is added between 0.5 and 5 k/ton, depending on the purity of lime to ensure a basic pH>11 when it starts to water.

Immediately after the DAE agent is added, directly to the same conveyor belt from a Hopper No 2.

The dosage of DAE should be between 5-10 kg per ton of ore. The DAE should be granulated to size between 2-3 millimeters.

That way the conveyor belt contains mineral, lime and DAE agent. Upon entering the mixing drum, a perfect mixture of solid reagents is achieved. Inside the mixing drum water or raffinate solutions are added to reach the determined degree of humidification, 3 to 4%.

TRANSFORMATION: At the exit of the mixing drum, the material is transported to the pad. This should rest between 20 and 30 days. In that period the reagent transforms pyrite into a porous mineral and solubilizes gold, both effects simultaneously.

WASHING: After the transformation period, the battery is washed with neutral water or with acidic refining solutions (around pH=2) to dislodge the gold in aqueous solution.

Figure 1:
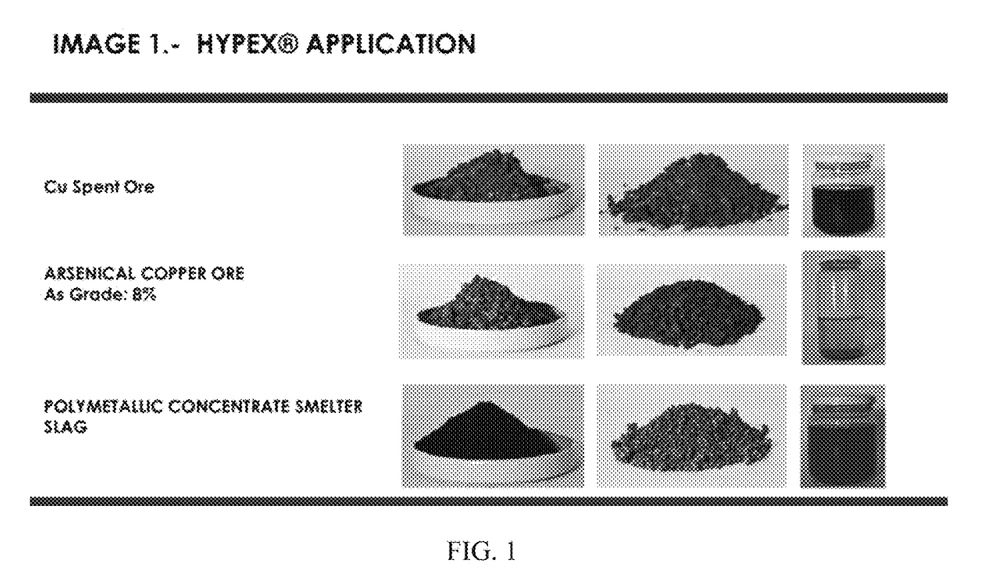
FIG. 1 shows three types of SCRE material processing according to the method of the present invention.

Brief Description of the FIG. 1

This scheme shows 3 types of SCRE material processing
Copper leaching Spent Ore
Gold ores contained in arsenopyrites (8% arsenic content)
Polymetallic Concentrate Smelter Slag

The invention claimed is:

1. A method for extracting base and precious metals by using a treatment to the solubilization of refractory matrices, the method comprising the steps of:
    crushing a mineral to a particle size distribution between 2.5 and 5 centimetres, if the mineral contains clay, the crushing step is to a particle size of 5 cm;
    adding a solid lime to the crushed mineral until obtaining a homogeneous mixture with a pH>11;
    adding a solid reagent to the homogeneous mixture until obtaining a humidity of 5 to 8 weight %;
    agglomerating the humidity containing mixture to form a glomer;
    depositing the glomer into a leach pad to form a cell;
    resting the cell by standing for a length of between 5 and 60 days to reduce moisture; and
    irrigating with a refining solution after the resting to extract the base and precious metals in an aqueous solution.

2. The method according to claim 1, wherein in a case of an extraction of free gold particles in oxidized matrices using NaCN, the method comprising the steps of:
    crushing the mineral to sizes of 2.5 cm, wherein if the mineral contains clay, the crushing step is to a particle size of 5 cm;
    adding a solid lime to the crushed mineral until obtaining a homogeneous mixture with a pH>11;
    adding solid NaCN reagent to the homogeneous mixture;
    agglomerating the humidity containing mixture to form a glomer;
    depositing the glomer into a leach pad to form a cell;
    resting the cell between 5 to 10 days; and
    irrigating after resting by spraying with refining solutions to extract the gold in a cyanide solution.

3. The method according to claim 1, wherein in a case of the extraction of free gold particles in oxidized matrices, NaCl used and the method comprising the steps of:
    crushing the mineral to sizes of 2.5 cm, wherein if the mineral contains clay, the reduction in size is to a particle size of 5 cm;
    adding a solid lime to the crushed mineral until obtaining a homogeneous mixture with a pH>11;
    adding solid NaCl reagent to the homogenous mixture;
    agglomerating the humidity containing mixture to form a glomer;
    depositing the glomer into a leach pad to form a cell;
    resting the cell from 10 to 15 days; and
    irrigating after resting by spraying with refining solutions to extract the gold in a chlorinated solution.

4. The method according to claim 1, wherein in a case of an extraction of gold particles encapsulated in sulfide grains, including pyrite, arsenopyrite or other sulfide, contained in silicates matrices, NaCl is used, the method comprising the steps of:
    crushing the mineral to a particle size of 2.5 cm, wherein if the mineral contains clay, the size reduction is to 5 cm;
    adding a solid lime to the crushed mineral until obtaining a homogeneous mixture with a pH>11;
    adding a solid NaCl reagent to the homogeneous mixture;
    agglomerating the humidity containing mixture to form a glomer;
    depositing the glomer into a leach pad to form a cell;
    resting the cell between 20 to 30 days; and
    irrigating after resting by spraying with refining solutions to extract the gold in a chlorinated solution.

5. The method according to claim 1, wherein in a case of the extraction of gold particles encapsulated in sulfide grains, including pyrite, arsenopyrite or other sulfide contained in silicates matrices, NaCl and NaCN are used, the method comprising the steps of:
    crushing the mineral to a particle size of 2.5 cm, wherein the mineral contains clay, the size reduction is to 5 cm;
    adding a solid lime to the crushed mineral until obtaining a homogeneous mixture with a pH>11;
    adding a solid NaCl reagent to the homogeneous mixture;
    adding solid NaCN reagent to the product of the previous step;
    agglomerating the humidity containing mixture to form a glomer;
    depositing the glomer into a leach pad to form a cell;
    resting the cell between 15 to 20 days; and
    irrigating after resting by spraying with refining solutions to extract the gold in an aqueous solution.

6. The method according to claim 1, wherein in case of the extraction of gold particles encapsulated in sulfide grains, including pyrite, arsenopyrite or other sulfide, contained in silicates matrices, a solid reagent is used only to decapsulate the gold trapped in the sulfide grains and then leach conventionally with cyanide solutions.

* * * * *